(12) United States Patent
Perego (10) Patent No.: US 11,673,157 B2
(45) Date of Patent: Jun. 13, 2023

(54) APPARATUS AND METHOD FOR THE APPLICATION OF SURFACE TREATMENTS ON ARTICLES

(71) Applicant: TAPEMATIC S.P.A., Ornago (IT)

(72) Inventor: Luciano Perego, Merate (IT)

(73) Assignee: TAPEMATIC S.P.A., Ornago (IT)

( * ) Notice: Subject to any disclaimer, the term of this patent is extended or adjusted under 35 U.S.C. 154(b) by 185 days.

(21) Appl. No.: 17/138,757

(22) Filed: Dec. 30, 2020

(65) Prior Publication Data

US 2021/0316326 A1 Oct. 14, 2021

(30) Foreign Application Priority Data

Apr. 9, 2020 (IT) .......................... 102020000007588

(51) Int. Cl.
| | |
|---|---|
| *B05B 13/02* | (2006.01) |
| *B05B 16/20* | (2018.01) |
| *B05B 16/00* | (2018.01) |
| *B23K 26/352* | (2014.01) |

(52) U.S. Cl.
CPC .......... *B05B 16/90* (2018.02); *B05B 13/0221* (2013.01); *B05B 16/20* (2018.02); *B23K 26/352* (2015.10)

(58) Field of Classification Search
USPC ................... 118/66, 500, 313, 315, 712, 324
See application file for complete search history.

(56) References Cited

U.S. PATENT DOCUMENTS

| | | | |
|---|---|---|---|
| 9,487,857 B2 | 11/2016 | Perego | |
| 2019/0047006 A1* | 2/2019 | Perego | .................... C23C 14/00 |

FOREIGN PATENT DOCUMENTS

| | | |
|---|---|---|
| EP | 3441148 A1 | 2/2019 |
| EP | 3599030 A1 | 1/2020 |
| EP | 3603818 A1 | 2/2020 |

OTHER PUBLICATIONS

Italian Search Report dated Nov. 23, 2020 from counterpart Italian Patent Application No. 102020000007588.

* cited by examiner

*Primary Examiner* — Yewebdar T Tadesse
(74) *Attorney, Agent, or Firm* — Shuttleworth & Ingersoll, PLC; Timothy Klima (57) ABSTRACT

A plurality of workpiece-holding spindles is arranged, each engaging an article being processed, and a plurality of trays, each removably engaging a plurality of said spindles. The trays are moved along a feeding line extending along a feeding path passing near a decoration module. By a transfer assembly, the spindles carrying the articles are transferred from the trays on the feeding path, to the decoration module. A decorative treatment is applied to the articles carried by the spindles, in correspondence with at least one treatment unit (40, 41, 42) operating along the decoration module. In correspondence with a painting module operatively connected with the feeding line, the articles carried by the spindles are painted.

14 Claims, 6 Drawing Sheets

APPARATUS AND METHOD FOR THE APPLICATION OF SURFACE TREATMENTS ON ARTICLES

This application claims priority to Italian Application No. 102020000007588 filed Apr. 9, 2020, which application is incorporated by reference herein.

The present invention relates to an apparatus for the application of surface treatments on articles. The invention also relates to a process for the application of surface treatments on articles, which can be carried out by said apparatus.

The use of caps, lids, bottles, tubes or other containers with a high degree of surface finish, obtained by a painting operation obtained by distributing one or more thin layers of generally transparent or semi-transparent lacquer or paint, is currently in high demand, for example in the pharmaceutical field, in cosmetics, etc.

An optimal execution of the painting generally requires that the articles are previously subjected to surface treatments aimed at preparing the surfaces for a correct adhesion with the lacquers or paints which are subsequently applied.

In many cases, especially in the cosmetics field but also in other fields, it is also requested that graphic patterns appear on the surface of the articles, such as identifying elements of a company brand, codes, decorative or embellishing elements, and/or containing informative or other text.

The application of these additional graphic patterns can be performed by various printing techniques, such as offset printing, digital printing, decal, pad printing, screen printing, hot printing, or other.

The application of the additional graphic elements currently requires that the previously painted articles undergo a further processing cycle which is distinct and separate from that used for painting.

In particular, it is requested that the articles leaving the surface finishing line dedicated to painting are neatly collected in special containers and transferred to a different production site, often located tens or hundreds of kilometres away, to be subjected to the application of additional graphic patterns.

Once at this other production site, the articles must undergo further manipulations for the application of the additional graphic patterns and final packaging.

The diversified processing of the articles in different locations involves significant logistical complications, which have a negative impact on production costs. Furthermore, the repeated manipulations of the articles increase the possibility of damage and is often the cause of processing defects resulting in an increase in waste and overall production costs.

The applicant has also observed that the graphic patterns applied to the articles are directly exposed to mechanical friction and stresses, as well as to external atmospheric agents such as humidity and UV radiation which may impair the prolonged maintenance of the aesthetic features thereof. It has also been observed that in many cases, to meet particular optical and/or tactile needs, the paints applied have physical features which are not compatible with a strong adhesion of the graphic patterns subsequently printed on the article. It follows that the graphic patterns can have a low resistance to mechanical abrasion and wear, compromising the maintenance of the aesthetic features of the product during use.

An object of the present invention is to significantly simplify the production processes for obtaining articles provided with graphic patterns applied in addition to a surface painting.

It is a further object of the invention to promote a permanent and lasting adhesion of the printed graphic patterns, offering the possibility of using the coating applied by painting to obtain, where required, an additional protection of the graphic patterns subsequently applied.

An object of the present invention is also to offer an apparatus which is easily adaptable, as necessary, for the application of graphic patterns, before or after the application of the layer of transparent lacquer or paint.

More in particular, according to a first aspect, an object of the present invention is an apparatus for the application of surface treatments on articles. Preferably, a plurality of workpiece-holding spindles is provided, each arranged to engage an article in processing. Preferably, a plurality of trays is provided, each arranged to removably engage a plurality of said spindles. Preferably, a decoration module carrying a handler of said spindles is provided. Preferably, a feeding line carrying movement devices of said trays is provided, extending along a feeding path passing near the decoration module. Preferably, a transfer assembly operates on the spindles to pick them up from the trays on the feeding path and transfer them to the decoration module. Preferably, at least one treatment unit operates along the decoration module to apply a decorative treatment to the articles carried by the spindles. Preferably, a painting module is operatively connected with the feeding line to paint the articles carried by the spindles.

According to a further aspect, the invention relates to a method for the application of decorative surface treatments on objects. Preferably, a plurality of workpiece-holding spindles is arranged, each engaging an article in processing. Preferably, a plurality of trays is arranged, each removably engaging a plurality of said spindles. Preferably, the trays are moved along a feeding line extending along a feeding path passing near a decoration module. Preferably, by means of a transfer assembly, the spindles carrying the articles are transferred from the trays on the feeding path, to the decoration module. Preferably, a decorative treatment is applied to the articles carried by the spindles, in correspondence with at least one treatment unit operating along the decoration module. Preferably, the articles carried by the spindles are painted in correspondence with a painting module operatively connected with the feeding line.

The engagement of the articles in processing on the spindles simplifies the transfer of the articles to the decoration module and to the painting module, allowing the application of the decorative and painting treatment without risking that the surfaces of the articles undergo alterations which could preclude or compromise the proper execution of the treatments themselves.

In at least one preferential embodiment, the invention further includes one or more of the following preferred features.

Preferably, the decoration module and the painting module respectively constitute two separate units.

Preferably, the painting module is separated from the decoration module along the feeding line and/or along the movement path.

Preferably, the painting module is operatively connected along the feeding line downstream of the decoration module and/or along the movement path.

Preferably, the spindles carrying the articles are repositioned on the trays before being transferred to the painting module.

Preferably, the transfer assembly is configured to operate in the absence of contact between the transfer assembly itself and the articles engaged on the spindles.

The absence of contact with the articles prevents unwanted surface alterations of the same before the completion of the decoration and painting treatments Preferably, the transfer assembly is configured to mutually move the spindles from a initial mutual interaxle spacing detectable on the tray to a final mutual interaxle spacing detectable at the decoration module.

It is therefore possible to adapt the distance between one article and another according to the dimensions of the apparatuses used to work on the articles themselves along the decoration and painting modules. For example, the articles can be sufficiently spaced apart along the decoration module to give the treatment unit the space necessary to work on one article without interfering with others, while the articles on the trays can be brought closer together to allow for a simultaneous painting treatment in confined spaces, for the benefit of compacting and structurally simplifying the system.

Preferably, the decoration module handler carries a plurality of posts each configured to engage one of the spindles and comprising a centering member slidably engageable with one of the spindles along a geometric axis of the spindle, and locking members of the respective spindle on the centering member.

This facilitates the engagement and disengagement operations of the spindles on the decoration module, while promoting a firm and stable positioning of the same to prevent unwanted movements due to the stresses transmitted to the articles during the treatment.

Preferably, the centering member comprises a plug axially insertable in a coupling seat coaxially carried by one end of the spindle.

Preferably, the plug slidably engages the coupling seat substantially free of clearance, so as to retain the geometric axis of the spindle in a predetermined orientation.

Preferably, the centering member has an engagement cavity configured to accommodate a base portion of the spindle for insertion along the geometric axis.

Preferably, the engagement cavity slidably engages the base portion substantially in absence of play, so as to retain the geometric axis of the spindle according to a predetermined orientation.

Preferably, each post is carried by a shaft rotatably idle around said geometric axis.

The rotation of the article during the application of the decorative treatment around it is thus supported.

Preferably, the locking members comprise a plurality of gripping inserts operatively housed near the engagement cavity and radially movable with respect to the geometric axis between a working position in which they protrude inside the engagement cavity to engage in an annular retaining groove arranged on the base portion of the spindle, and a rest position in which they are radially distant from the geometric axis to free the sliding of the base portion with respect to the engagement cavity.

Preferably, the locking members further comprise a sleeve circumscribing the engagement cavity and axially movable with respect to the latter, and having a frusto-conical wall operating on the gripping inserts to move them radially following an axial translation of the sleeve itself.

Preferably, the treatment unit comprises a printing group having a printing matrix operating against the article in radial thrust relations with the geometric axis of the spindle.

Preferably, the decoration module comprises at least one abutment assembly opposite said treatment unit and operating against the article carried by the spindle to counteract thrust actions transmitted to the article itself on the action of the treatment unit.

It is thus possible to increase the thrust action and efficiency of the printing group without causing deformations or unwanted movements of the article in processing.

Preferably, the abutment assembly comprises a pair of respectively parallel contrast rollers.

Preferably, said contrast rollers are movable between a working position in which they act against the article carried by the spindle in correspondence with the treatment unit, and a rest position in which they are moved away from the article to free the movement thereof along the decoration module.

Preferably, the decoration module comprises a laser engraving unit configured to remove surface layers from the article carried by the spindle.

Preferably, the laser engraving unit operates along the decoration module downstream of the printing group, to remove portions of a decorative layer applied to the article by the printing group itself.

Removing parts of the decorative layer by means of lasers allows very detailed graphics to be carried out, useful for example for obtaining bar codes or QR codes.

Preferably, the transfer assembly comprises: a first manipulator configured to simultaneously pick up a plurality of spindles from one of said trays; a continuous conveyor configured to receive the spindles from the first manipulator; a second manipulator configured to individually transfer the spindles from the continuous conveyor to the decoration module.

It is therefore possible to remove the spindles arranged at a close mutual distance from the tray, and distribute them on the decoration module according to an optimal interaxle spacing for the application of the decorative treatments.

Preferably, the first manipulator comprises a plurality of gripping members mutually interconnected by a pantograph mechanism, geometrically deformable to change the mutual distance between gripping members.

Preferably, the continuous conveyor carries a plurality of supports configured to engage each of the spindles, equidistant according to an interaxle spacing greater than an initial interaxle spacing detectable between the spindles engaged on the tray.

Preferably, the continuous conveyor carries a plurality of supports configured to engage each of the spindles, equidistant according to an interaxle spacing less than a final interaxle spacing detectable between the posts on the handler.

Preferably, the continuous conveyor extends according to a closed line having a first movable section at a first cadence and a second movable section at a second cadence different from the first cadence.

For example, the first section may have a relatively low movement cadence, consistent with the cadence at which the spindles are simultaneously transferred from the trays to the continuous conveyor, while the transfer of the individual spindles at the second section takes place at a higher movement cadence. In a time span comprising a plurality of spindle transfers from respective trays, the amount of spindles transferred from the second section to the decoration module will be equal to the amount of spindles transferred from the trays to the first section.

Preferably, the continuous conveyor has at least one compensation portion interposed between the first and the second section and wrapped around at least one end pulley.

Preferably, the end pulley is movable to vary the length of the compensation portion in response to the movement of the continuous conveyor at the first and/or the second section.

It is thus possible to compensate for the different movement speeds which can be detected instant by instant along the first and the second section of the continuous conveyor.

Preferably, the continuous conveyor comprises a first motorization operating on the first section, and a second motorization operating on the second section.

Preferably, the first motorization operates on at least a first motorized pulley operating on the first section of the continuous conveyor.

Preferably, the second motorization comprises at least a second motorized pulley operating on the second section of the continuous conveyor.

Preferably, the transfer of the spindles is performed in the absence of contact between the transfer assembly and the articles engaged on the spindles.

Preferably, during the transfer the spindles are mutually moved away from a initial mutual interaxle spacing detectable on the tray to a final mutual interaxle spacing detectable at the decoration module.

Preferably, the transfer of each spindle to the decoration module comprises engaging the spindle on a centering member sliding along a geometric axis thereof, and locking the spindle on the centering member.

Preferably, the engagement of the spindle with the centering member occurs substantially in absence of play, so as to retain the geometric axis of the spindle according to a predetermined orientation.

Preferably, the centering member is carried by a shaft rotatably idle around said geometric axis.

Preferably, the application of the decorative treatment is performed by a printing matrix operating against the article in radial thrust relations with the geometric axis of the spindle, to apply a decorative surface layer on the article.

Preferably, it is also provided to counteract the thrust transmitted to the article by the treatment unit.

Preferably, said counteracting action is performed by positioning at least one abutment opposite said treatment unit against the article carried by the spindle.

Preferably, a laser engraving treatment is performed along the decoration module, which removes surface layers from the article carried by the spindle.

Preferably, the laser engraving treatment is performed after the application of the decorative treatment, to remove portions of said decorative layer.

Preferably, the transfer of the spindles from the feeding line to the decoration module comprises: simultaneously picking up a plurality of spindles from one of the trays; simultaneously transferring the spindles picked up from the tray onto a continuous conveyor; individually transferring the spindles from the continuous conveyor to the decoration module.

Preferably, the spindles picked up from the tray are mutually spaced starting from an initial interaxle spacing during the transfer on the continuous conveyor.

Preferably, the spindles are mutually spaced during the transfer from the continuous conveyor up to assuming a final interaxle spacing on the decoration module.

Preferably, during the transfer the spindles are moved according to different cadences respectively along a first section and a second section of the continuous conveyor.

Preferably, the action of varying the length of a compensation portion of the continuous conveyor interposed between the first and the second section is provided, in response to the movement of the continuous conveyor in correspondence with the first and/or the second section.

Further features and advantages will become more apparent from the detailed description of a preferred, but not exclusive, embodiment of an apparatus for the application of surface treatments on articles, and of a method for the application of surface treatments feasible by means of said apparatus. Such description will be set forth hereinafter with reference to the accompanying drawings given only for illustrative and, therefore, non-limiting purpose, in which.

With reference to the mentioned figures, the number 1 generally indicates an apparatus for the application of surface treatments on articles, in accordance with the present invention.

The apparatus 1 comprises a feeding line 2 along which, for example by means of one or more belt conveyors 3 or other suitable movement devices, a plurality of workpiece-holding spindles 4 is advanced.

Figure 1:
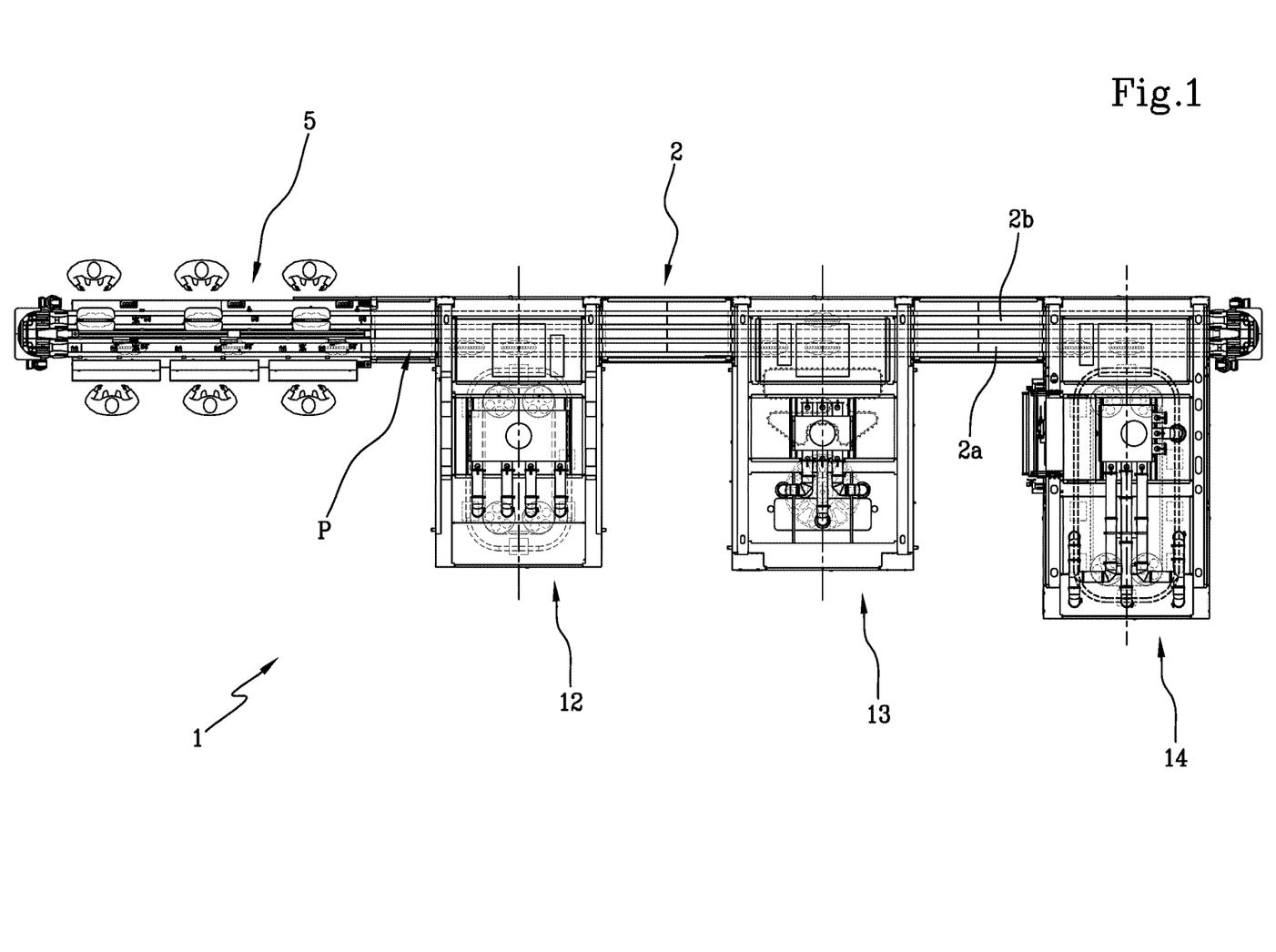
FIG. 1 schematically shows a plan view of an apparatus for the application of surface treatments on articles, in accordance with the present invention.

In the illustrated example, the feeding line 2 extends according to a closed line, having a forward branch 2a and a return branch 2b parallel side by side for at least a part of the extension thereof, and connected to a loading-unloading station 5.

Each spindle 4 is configured to detachably engage a respective article 6 (FIG. 4) in processing.

Figure 4:
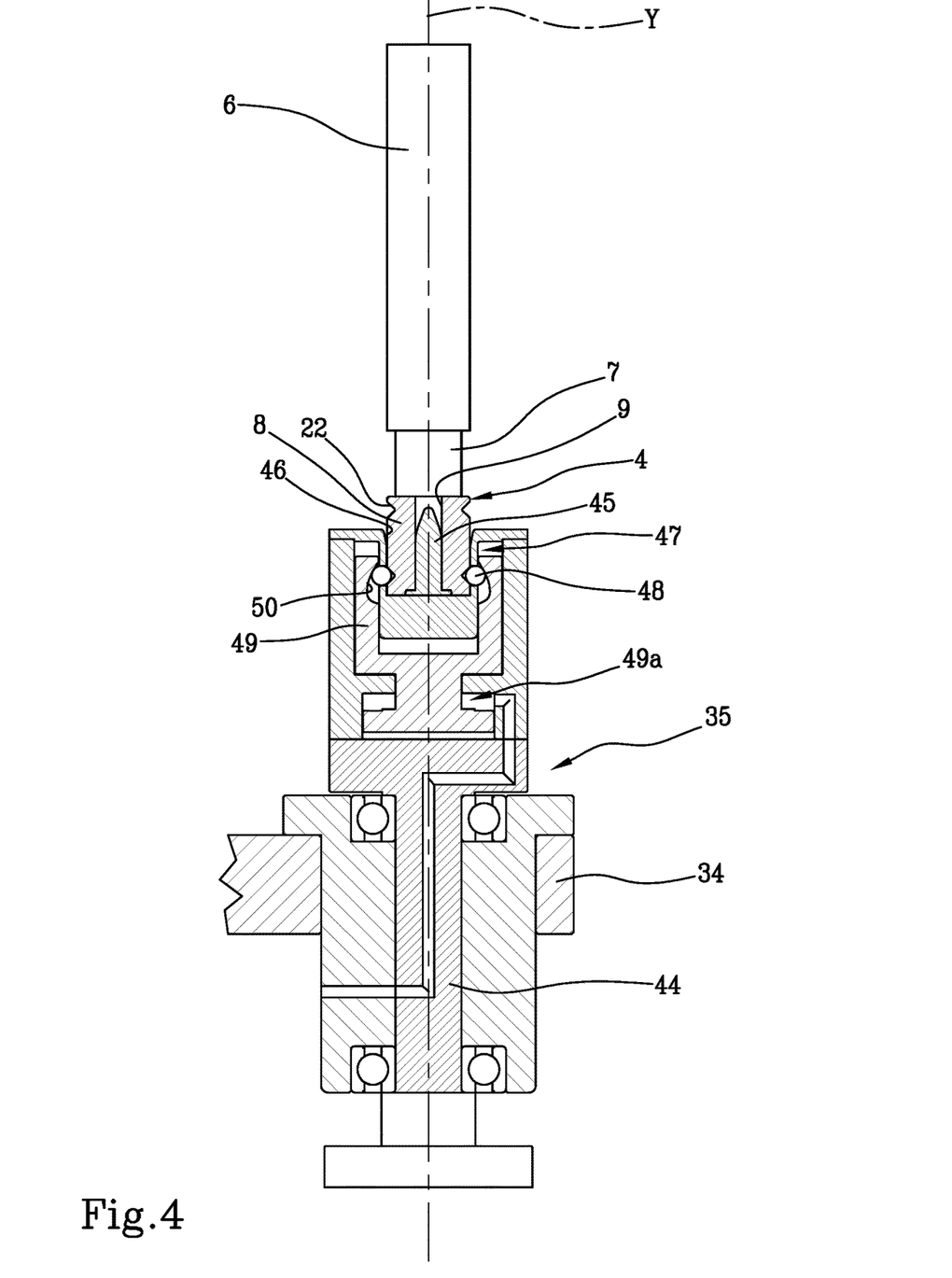
FIG. 4 shows in cross-section one of the posts arranged on the handler of the decoration module.

For example, as visible in FIG. 4, each spindle 4 may comprise a stem 7 coaxially insertable into one of the articles 6 to support and retain it adequately so that a geometric axis of the article coincides with a geometric axis Y of the spindle itself. Preferably, the stem 7 rises from a substantially cylindrical base portion 8 defining a lower end of the spindle 4. A coupling seat 9 coaxial to the geometric axis Y of the spindle 4 and open towards the lower end of the latter is obtained in the base portion 8.

It can be provided that, at least for the purposes of movement along the feeding line 2, the spindles 4 are supported by respective trays 10, moved along the conveyor belt 3. Each tray 10 is suitable for engaging a predetermined number of spindles 4, preferably aligned to form a row. In the illustrated example, thirteen spindles 4 are provided, but each tray 10 can accommodate any number of spindles 4, also chosen in relation to the maximum quantity compatible with the dimensions of the tray 10 and the articles 6 to be accommodated thereon.

Each spindle 4 lends itself to be removably engaged to the respective tray 10 by a support pin 11 axially insertable along the respective engagement seat 9, as described, for example, in U.S. Pat. No. 9,487,857.

The engagement of the articles 6 in processing on the respective spindles 4, as well as the engagement of the latter on the trays 10, can be performed manually or automatically in the loading-unloading station 5 arranged along the feeding line 2.

The trays 10 positioned on the feeding line 2 at the loading-unloading station 5 advance along a feeding path P according to a feed direction A and, after passing through a possible conditioning station 12 in which the articles 6 are cleaned and/or subjected to other preparation treatments, arrive near a decoration module 13 assigned to apply a decorative treatment to the articles 6 carried by the spindles 4. A painting module 14 is operatively connected to the feeding line 2, preferably downstream of the decoration module 13, to paint the articles 6 in processing with at least one layer of lacquer or paint, usually transparent or semi-transparent, having protective and/or aesthetic embellishment functions.

Between the feeding line 2 and the decoration module 13 at least one transfer assembly 15 operating on the spindles 4 is operatively arranged to simultaneously pick them up from the trays 10 and individually transfer them to the same decoration module 13.

Figure 2:
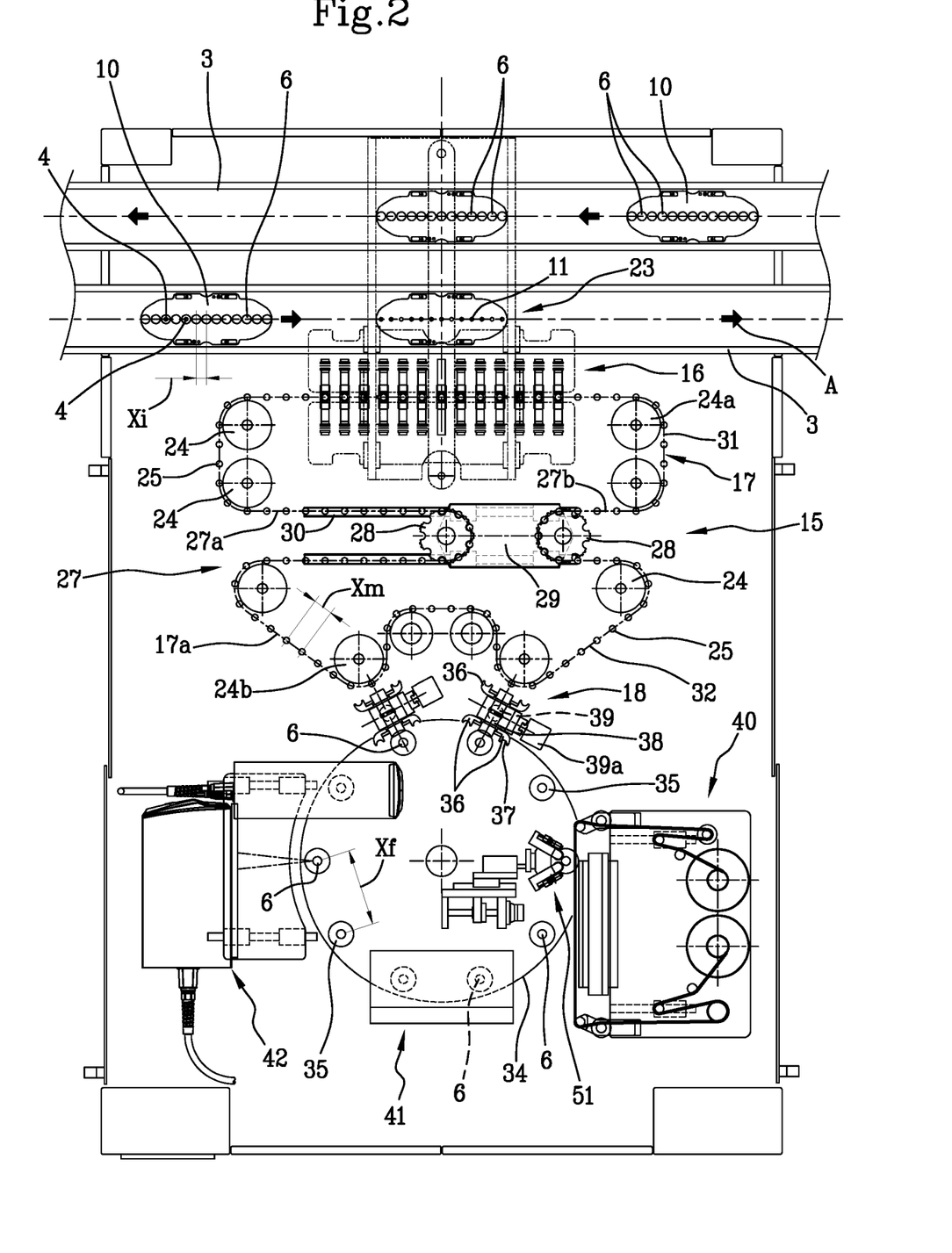
FIG. 2 shows an enlarged detail of FIG. 1, highlighting a decoration module.

In the illustrated example, the transfer assembly 15 comprises at least a first manipulator 16 configured to pick up the row of spindles 4 carried by the tray 10 which, translating along the feeding line 2, arrives and is preferably stopped near the decoration module 13, a continuous conveyor 17 configured to receive the spindles 4 from the first manipulator 16, and at least a second manipulator 18 configured to individually transfer the spindles 4 from the continuous conveyor 17 to the decoration module 13.

It is preferably provided that the first manipulator 16, the continuous conveyor 17 and the second manipulator 18 carry out the transfer of the spindles 4 in the absence of contact with the articles 6 carried by the spindles 4 themselves, so as to preserve the surface integrity of the same articles 6.

The first manipulator 16 is alternately movable between the feeding line 2 and the continuous conveyor 17. At each work cycle, the first manipulator 16 simultaneously picks up the entire row of spindles 4 carried by the same tray 10, stopped along the feeding line 2 near the decoration module 13, to transfer them to the continuous conveyor 17, and vice versa.

Figure 3:
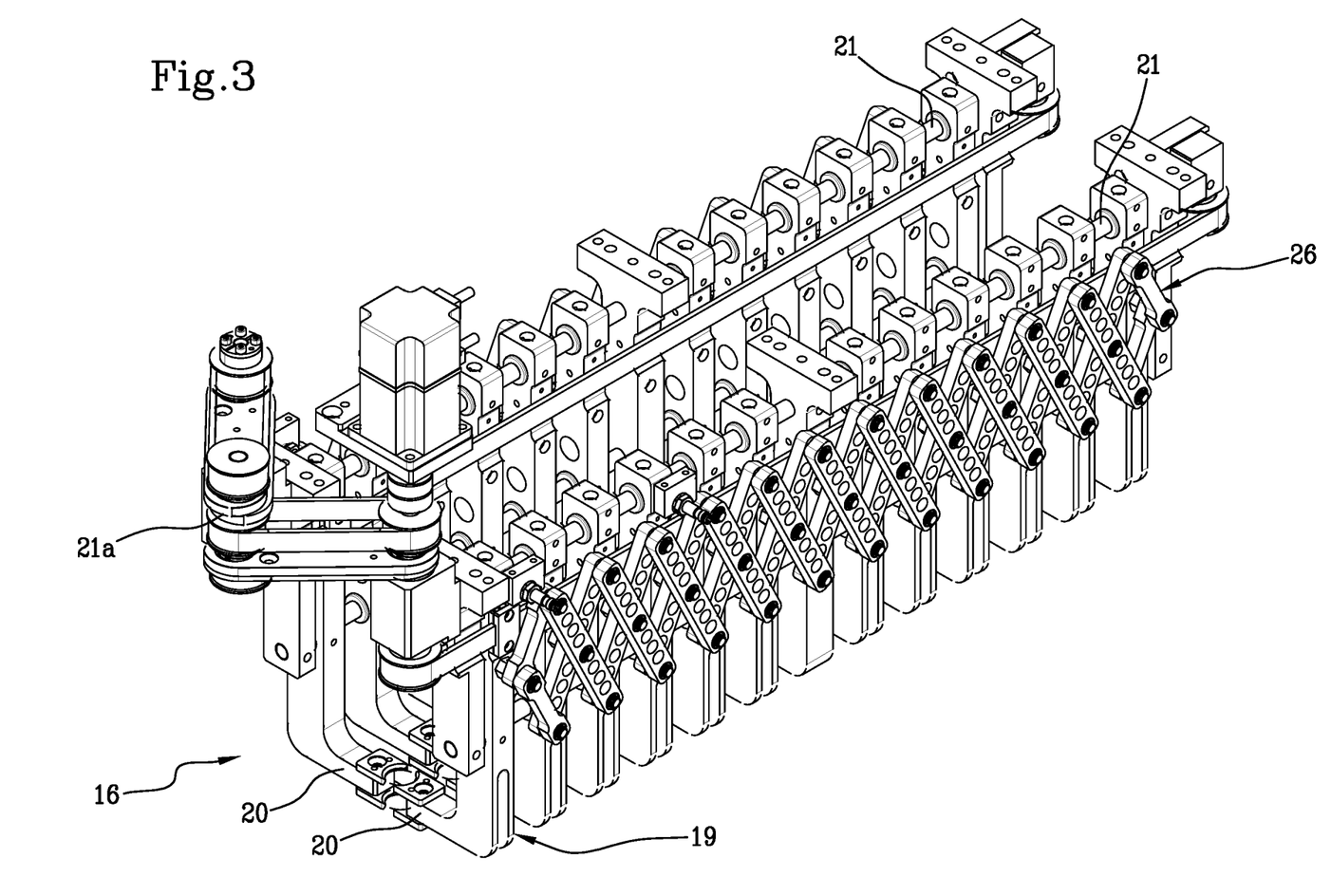
FIG. 3 shows a perspective view of a first manipulator operating near the decoration module.

The first manipulator 16 may comprise a plurality of gripping members 19 each provided with a pair of jaws 20 carried by respective bars 21, movable towards and away from each other on the action of one or more actuators 21a. The approach of the bars 21 causes a reciprocal alignment of the jaws 20 of each clamping member 19, so as to determine the simultaneous engagement of the spindles 4, for example each in correspondence with at least one annular retaining groove 22 arranged on the base portion 8 thereof.

A movement assembly 23 on two Cartesian axes operates on the bars 21 so as to move the gripping members 19 vertically in order to disengage the row of spindles 4 from the tray 10, removing the same spindles 4 from the respective support pins 11, and horizontally in order to transfer the row of spindles 4 to the continuous conveyor 17.

The continuous conveyor 17 may comprise a continuous element 17a, for example a belt or chain, extending along a closed line around respective return pulleys 24, and carrying a plurality of supports 25 configured to engage each of the spindles 4 in a manner similar to the support pins 11. Preferably, the supports 25 of the continuous conveyor 17 are mutually equidistant, according to an intermediate interaxle spacing Xm greater than an initial interaxle spacing Xi detectable between the spindles 4 engaged on the tray 10.

To arrange the spindles 4 picked up from the tray 10 for the engagement with the continuous conveyor 17, it is preferably provided that the gripping members 19 are slidable along the respective bars 21 and mutually interconnected by a pantograph mechanism 26 comprising mutually hinged levers. During the horizontal translation from the tray 10 towards the continuous conveyor 17, at least one actuator 39a associated with each of the bars 21 moves the gripping members 19, with the help of the pantograph mechanism 26 which synchronizes the movements thereof, so that when the spindles 4 arrive above the continuous conveyor 17 they are spaced according to the intermediate interaxle spacing Xm between the supports 25.

A downward movement of the first manipulator 16 determines the simultaneous engagement of the row of spindles 4 on the respective supports 25 of the continuous conveyor 17.

With a cycle of reverse movement with respect to that described above, the first manipulator 16 also provides for picking up a row of spindles 4 from the continuous conveyor 17 which are carrying the respective articles 6 previously treated in the decoration module 13, to simultaneously transfer them to the previously emptied tray 10, before starting a new operating cycle on the spindles 4 carried by a new tray 10 which arrives along the feeding line 2.

Preferably, along the extension of the continuous conveyor 17 a compensation portion 27 is defined having a first and a second section 32 of compensation 27a, 27b respectively opposite, respectively carrying the articles 6 to be sent to the decoration module 13 for the treatment, and articles 6 already treated coming from the same decoration module 13. The first and the second section 32 of compensation 27a, 27b are each wrapped around a respective end pulley 28 so as to assume a substantially "U"-shaped conformation. The end pulleys 28 are mounted on a slider 29 transversely movable between the feeding line 2 and the decoration module 13, preferably along a straight guide 30.

On the respective opposite sides of the movement path of the slider 29 defined by the straight guide 30, a first section 31 and a second section 32 of the continuous conveyor 17 can be identified, passing respectively near the first manipulator 16 and near the second manipulator 18 operating on the decoration module 13.

A first motorization comprises at least a first motorized pulley 24a operating on the continuous conveyor 17 along the first section 31, so that the latter is operated intermittently, according to a step-by-step movement with a first cadence corresponding to the cadence with which the first manipulator 16 performs the transfer of the rows of spindles 4 coming from subsequent trays 10. For each movement step on the first section 31, the spindles 4 transferred thereon perform a movement of an entity substantially equal to the length of the row of spindles 4 transferred from the tray 10, so as to prepare the continuous conveyor 17 for the removal of the articles 6 already treated and to accommodate a new row of spindles 4 picked up from a new tray 10.

Along the second section 32 of the continuous conveyor 17, located near the decoration module 13, a second motorization operates comprising for example at least a second motorized pulley 24b. The action of the second motorized pulley 33a imposes on the spindles 4 carried by the second section 32 a substantially continuous or alternating step-by-step movement, in accordance with a second cadence greater than the first movement cadence. The movement cadence of the spindles 4 at the second section 32, understood as the number of spindles 4 passing through the same point in the unit of time, is equal to the product of the first cadence for the number of spindles 4 transferred on the continuous conveyor 17 at each work cycle performed by the first manipulator 16.

The difference between the first movement cadence and the second movement cadence causes instantaneous speed differences detectable respectively along the first and the second section 32 of the continuous conveyor 17. These instantaneous speed differences are compensated by moving along the guide 30 the slider 29 and the end pulleys 28 carried thereby, so as to vary the length of the first and the second compensation section 32 in response to the movement of the continuous conveyor 17 at the first and/or the second section 32. More in particular, when the first section 31 of the continuous conveyor 17 translates to move the spindles 4 deposited thereon away from the action zone of the first manipulator 16, a translation of the slider 29 and the end pulleys 28 determines a corresponding elongation of the first compensation section 27a, and a shortening of the second compensation section 27b.

While the movement of the spindles 4 along the second section 32 continues with the second cadence thereof, the first section 31 remains stationary to allow the first manipulator 16 to pick up from the continuous conveyor 17 a row of spindles 4 carrying the articles 6 treated in the decoration module 13 and transfer them to the empty tray 10, and pick up a new row of spindles 4 from a new full tray 10 for the transfer of the articles 6 to be decorated onto the continuous conveyor 17. A progressive movement of the slider 29 along the guide 30, in the direction opposite the previous one, also compensates in this case for the difference in movement speed between the first and the second section 32.

As the spindles 4 carrying the articles 6 to be treated arrive at the decoration module 13, the second handler 18 individually picks them up from the continuous conveyor 17 to transfer them to a manipulator 24 forming part of the same decoration module. In the illustrated example, the handler 24 of the decoration module 13 is represented by a rotating table, which moves substantially along a closed circular line the articles 6 in processing carried by the spindles 4 engaged in respective posts 35.

The posts 35 on the handler 34 can be distributed according to a final interaxle spacing Xf suitable to leave sufficient space between one article 6 and the other to allow the action of the treatment units 40, 41, 42.

The second manipulator 18 may comprise a pair of grippers 36, each comprising a pair of jaw elements 37 mutually movable towards and away from each other to engage the respective spindle 4, for example at the annular retaining groove 22. The grippers 36 are carried by respective arms 38 arranged in diametrically opposite positions with respect to a central shaft 39. While one of the grippers 36 operates on the continuous conveyor 17 to transfer one of the spindles 4 carrying the articles 6 to be treated to the decoration module 13, the other gripper 36 operates on the handler 34 of the decoration module 13 to transfer one of the spindles 4 carrying the treated articles 6 to the continuous conveyor 17. The central shaft 39 is axially movable on the command of a respective actuator 39a, to determine the disengagement and engagement of the spindles 4 from the respective supports 25 of the continuous conveyor 17 and from the respective posts 35 on the handler 34. A 180° rotation of the central shaft 39, after axial movement to extract the spindles 4 from the respective support pin 11 and post 35, determines the exchange of position between two spindles 4 respectively carried by the continuous conveyor 17 and the decoration module 13, to engage them in inverted positions respectively with the respective support pin 11 and post 35 following a new axial movement of the central shaft 39 in the direction opposite the previous one.

On the command of the handler 34, the spindles 4 transferred to the individual posts 35 translate according to a step-by-step movement and arrive near at least one treatment unit 40, 41, 42 operating along the decoration module 13 to apply a decorative treatment on the articles 6.

The rotation of the handler 34 is indexed in synchrony with that of the second section 32 of the continuous conveyor 17, so that the spindles 4 individually picked up from the latter are each placed on one of the posts 35. The posts 35 on the handler 34 are mutually spaced apart from the final interaxle spacing Xf. Such a final interaxle spacing Xf, greater than the initial interaxle spacing Xi and the intermediate interaxle spacing Xm detectable between the spindles 4 carried by the continuous conveyor 17, is suitable to leave sufficient space between one article 6 and the other to allow the action of the treatment units 40, 41, 42.

Figure 5:
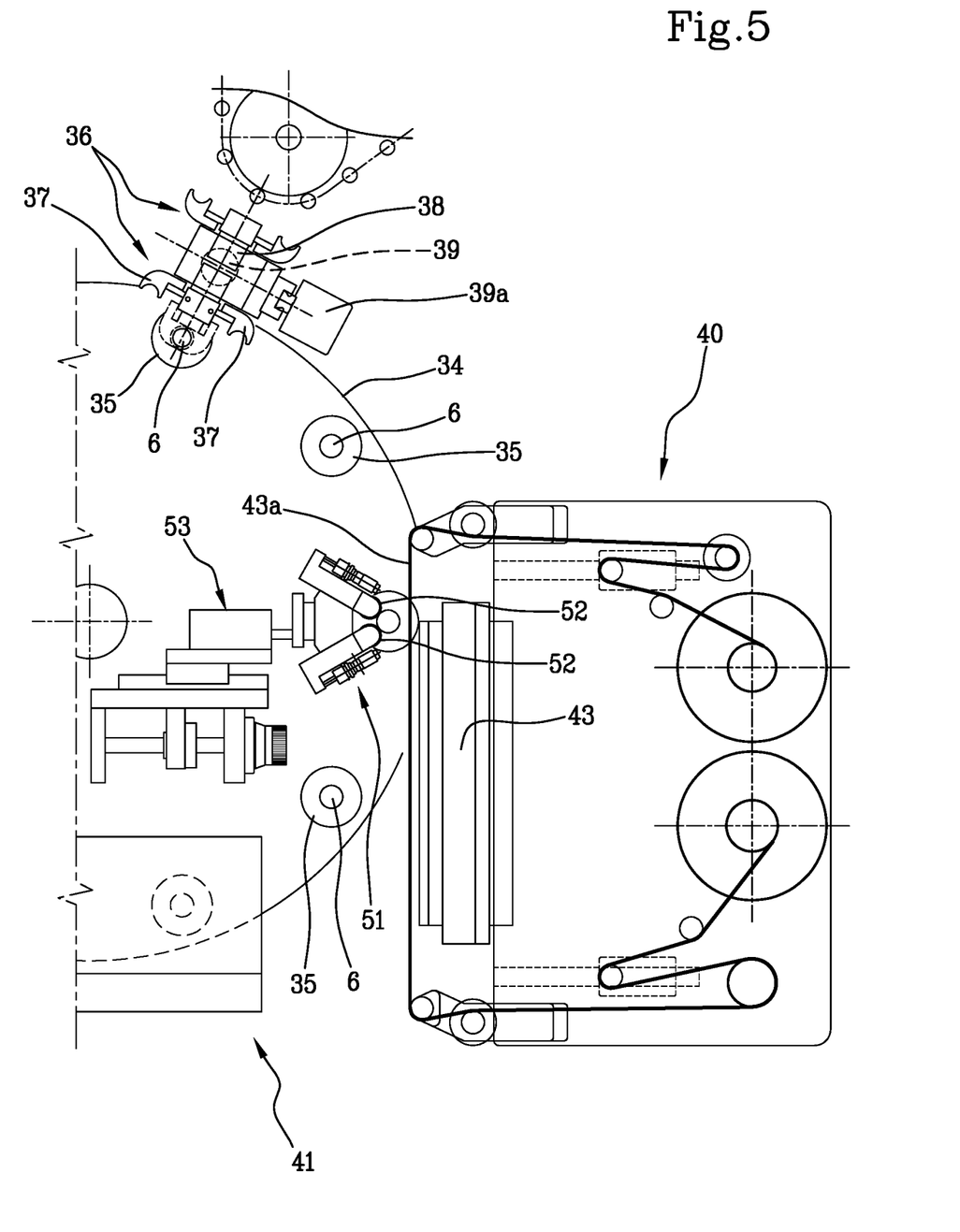
FIG. 5 shows an enlarged detail of FIG. 2, highlighting a treatment unit and an abutment assembly operating along the decoration module.

In the example shown, a first, a second and a third treatment unit 40, 41, 42 are provided angularly spaced along the path followed by the spindles 4. One of them, for example the first treatment unit 40, may comprise a hot printing group, of the type also called "hot foil", comprising a printing matrix 43 having a work surface carrying in relief the decorative graphics to be transferred to the surface of the articles 6. A film 43a carrying a pigment or other decorative material to be transferred to the surface of the articles 6 is positioned on the work surface. At each work cycle, the printing matrix 43 and the film 43a are brought in radial thrust relations against the surface of the article 6 and translated to distribute the decorative material on the cylindrical side surface of the latter, while the article 6 rotates around the geometric axis Y so as to cancel relative sliding between the film and the surface of the article 6 at the points of reciprocal contact.

One of the treatment units 40, 41, 42, for example the second treatment unit 41 only schematically indicated, may comprise a second hot-foil printing group, arranged to operate on a base wall presented above by the article 6. In this case the die of the second printing group and the article 6 may maintain a static positioning during the application of the decoration on the entire surface in question.

One of the treatment units 40, 41, 42, for example the third treatment unit 42 only schematically indicated, may comprise a laser engraving unit configured to remove surface layers from the article 6 carried by the spindle 4. Preferably, the laser engraving unit operates along the decoration module 13 downstream of one or both printing assemblies, to remove portions of the decorative layer applied on the article 6 by the same printing group. The use of a laser engraving unit can simplify the creation of the dies of the hot-foil printing assemblies, since very complex and/or detailed graphic reproductions can be obtained by removing parts of the decorative material. Different graphics from one article 6 to another, or particular graphics such as bar codes, QR codes and the like, can also be easily made.

As best seen in FIG. 4, each post 35 is preferably carried by a shaft 44 rotatably idle around said geometric axis Y, to allow the rotation of the article 6 during the action of the first printing group 40.

So that the articles 6 can effectively withstand the stresses induced by the treatment units 40, 41, 42, in particular the thrusts transmitted by the printing group, without being deformed and/or being ousted from the respective posts 35, it is preferably provided that each post 35 comprises a centering member 45, 46 slidably engageable with one of the spindles 4 along the geometric axis Y of the spindle 4 itself, and locking members 47 of the respective spindle 4 on the centering member 45, 46.

The centering member 45, 46 may for example comprise a plug 45 axially insertable into the coupling seat 9 of the spindle 4 and/or an engagement cavity 46 configured to accommodate a base portion 8 of the spindle 4 for insertion along the geometric axis Y. Preferably, the plug 45 and/or the engagement cavity 46 slidably engage the respective coupling seat 9 and the base portion 8 substantially in absence of play, so as to retain the geometric axis Y of the spindle 4 according to a predetermined orientation.

The locking member 47 of each post 35 may in turn comprise a plurality of gripping inserts 48, for example in the form of balls, operatively housed near the engagement cavity 46, and radially movable with respect to the geometric axis Y through an inner wall of the engagement cavity 46, on the command of a sleeve 49 circumscribing the same engagement cavity and axially movable with respect to the latter, on the command of a fluid dynamic actuator 49a. The sleeve 49 internally has a frusto-conical wall 50 operating on the gripping inserts 48 to move them radially following an axial translation of the sleeve 49 itself. After the spindle 4 has been inserted on the centering member 45, 46, the sleeve 49 is axially moved to translate the gripping inserts 48 from a rest position in which they result radially away from the geometric axis Y to free the sliding of the base portion 8 with respect to the engagement cavity 46, to a working position in which they protrude inside the engagement cavity 46 to engage in the annular retaining groove 22 of the spindle 4, so as to firmly retain the latter on the centering member 45, 46.

The decoration module 13 may further comprise at least one abutment assembly 51 opposite to the first printing group or other treatment unit 40, 41, 42, and operating against the article 6 to counteract the thrust actions transmitted thereto on the action of the first printing group 40.

Figure 6:
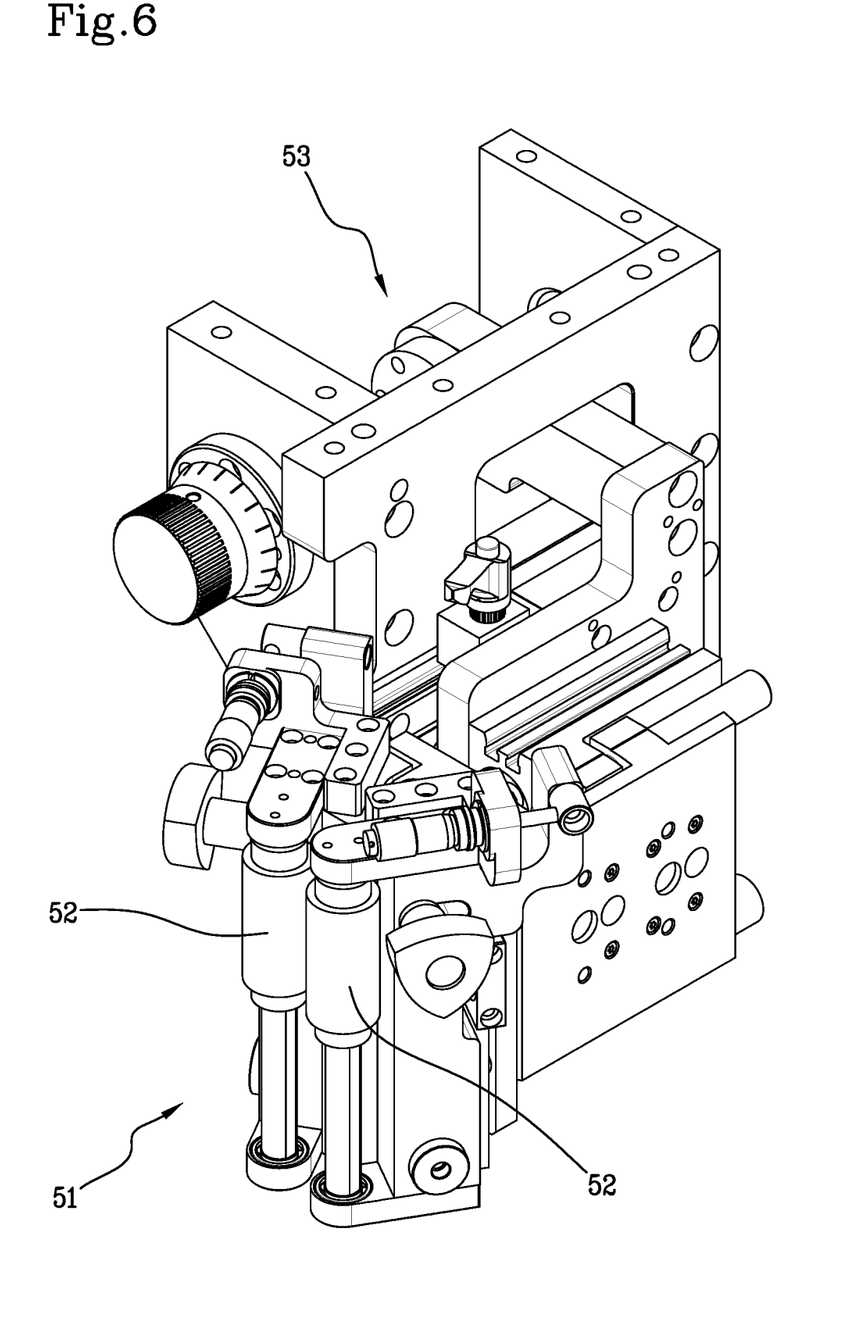
FIG. 6 shows the abutment assembly in perspective view.

The abutment assembly 51 may for example comprise at least one abutment, preferably defined as a pair of respectively parallel contrast rollers 52, mounted on a movement assembly 53 fixed to a supporting structure (not visible in the drawings) above the handler 34. On the action of the movement assembly 53, the contrast rollers 52 are movable from a rest position in which they are distanced from the article 6 to free the movement thereof along the decoration module 13, to a working position in which they act against the lateral surface of the article 6 carried by the spindle 4 in correspondence with the first treatment unit 40, so as to effectively counteract the radial thrusts transmitted by the die of the first printing group 40.

At the end of the treatment along the decoration module 13, the spindles 4 carrying the treated articles 6 are individually transferred to the continuous conveyor 17 by the second manipulator 18, to be returned in correspondence with the feeding line 2, where the first manipulator 16 transfers them to the trays 10. The trays 10 carrying the treated articles 6 resume their stroke along the feeding line 2 to reach the painting module 14. The painting module 14, achievable for example as described in EP 3 599 030 A1, on behalf of the same applicant, applies at least one layer of paint or lacquer, preferably transparent or semi-transparent, on the surfaces of the articles 6. The layer applied by the painting module 14, in addition to conferring desired aesthetic and/or tactile features to the articles 6, exerts a protective function of the decorative treatments previously applied in the decoration module 13, preserving them from accidental abrasions and damage due to subsequent manipulations and/or other external agents.

The invention claimed is:

1. An apparatus for application of surface treatments on articles, including:
    workpiece-holding spindles, each configured to engage an article being processed;
    trays, each arranged to removably engage a plurality of said workpiece-holding spindles;
    a decoration module carrying a handler of said workpiece-holding spindles;
    a feeding line carrying devices for moving said trays, and extending along a feeding path passing near the decoration module;
    a transfer assembly operating to pick the workpiece-holding spindles up from the trays on the feeding path and transfer the workpiece-holding spindles to the decoration module;
    at least one treatment unit operating along the decoration module to apply a decorative treatment to the articles carried by the workpiece-holding spindles;
    a painting module operatively connected with the feeding line for painting the articles carried by the workpiece-holding spindles,
    wherein the handler carries:
        a plurality of posts each configured to individually engage one workpiece-holding spindle of the workpiece-holding spindles and comprising a centering member slidably engageable with said one workpiece-holding spindle along a geometric axis of said one workpiece-holding spindle; and
        locking members of the one workpiece-holding spindle on the centering member.

2. The apparatus according to claim 1, wherein the transfer assembly is configured to operate withoutin contact between the transfer assembly and the articles engaged on the workpiece-holding spindles.

3. The apparatus according to claim 1, wherein the transfer assembly is configured to reciprocally move the workpiece-holding spindles from a reciprocal initial interaxle spacing detectable on the trays, to a reciprocal final interaxle spacing detectable at the decoration module.

4. The apparatus according to claim 1, wherein the centering member has an engagement cavity configured to receive a base portion of said one workpiece-holding spindle for insertion along the geometric axis to retain the geometric axis of the one workpiece-holding spindle according to a predetermined orientation.

5. The apparatus according to claim 1, wherein the locking members comprise gripping inserts operatively housed near the engagement cavity and movable radially with respect to the geometric axis between a working position in which the gripping inserts protrude inside the engagement cavity to engage in an annular retaining groove arranged on atho base portion of said one workpiece-holding spindle, and a rest position in which the gripping inserts are positioned further radially away from the geometric axis to enable the base portion to slide with respect to the engagement cavity.

6. An apparatus for application of surface treatments on articles, including:
    workpiece-holding spindles, each configured to engage an article being processed;
    trays, each arranged to removably engage a plurality of said workpiece-holding spindles;
    a decoration module carrying a handler of said workpiece-holding spindles;

a feeding line carrying devices for moving said trays, and extending along a feeding path passing near the decoration module;

a transfer assembly operating to pick the workpiece-holding spindles up from the trays on the feeding path and transfer the workpiece-holding spindles to the decoration module;

at least one treatment unit operating along the decoration module to apply a decorative treatment to the articles carried by the workpiece-holding spindles;

a painting module operatively connected with the feeding line for painting the articles carried by the workpiece-holding spindles, wherein the decoration module comprises at least one abutment assembly opposed to said at least one treatment unit and operating against the article carried by each of the workpiece-holding spindles to counteract thrust actions transmitted to the article itself on the action of the at least one treatment unit.

7. The apparatus according to claim 6, wherein the abutment assembly comprises a pair of respectively parallel contrast rollers.

8. The apparatus according to claim 6, wherein the abutment assembly is movable between a working position in which the abutment assembly acts against the article carried by each of the workpiece-holding spindles in correspondence with the treatment unit, and a rest position in which the abutment assembly is spaced away from the article to release movement of the article along the decoration module.

9. An apparatus for application of surface treatments on articles, including:

workpiece-holding spindles, each configured to engage an article being processed;

trays, each arranged to removably engage a plurality of said workpiece-holding spindles;

a decoration module carrying a handler of said workpiece-holding spindles;

a feeding line carrying devices for moving said trays, and extending along a feeding path passing near the decoration module;

a transfer assembly operating to pick the workpiece-holding spindles up from the trays on the feeding path and transfer the workpiece-holding spindles to the decoration module;

at least one treatment unit operating along the decoration module to apply a decorative treatment to the articles carried by the workpiece-holding spindles;

a painting module operatively connected with the feeding line for painting the articles carried by the workpiece-holding spindles, wherein the at least one treatment unit comprises at least one printing group having a printing matrix operating against the article in radial thrust relation to a geometric axis of each of the workpiece-holding spindles, and a laser engraving unit operating along the decoration module downstream of the printing group, to remove portions of a decorative layer applied on the article by the at least one printing group.

10. An apparatus for application of surface treatments on articles, including:

workpiece-holding spindles, each configured to engage an article being processed;

trays, each arranged to removably engage a plurality of said workpiece-holding spindles;

a decoration module carrying a handler of said workpiece-holding spindles;

a feeding line carrying devices for moving said trays, and extending along a feeding path passing near the decoration module;

a transfer assembly operating to pick the workpiece-holding spindles up from the trays on the feeding path and transfer the workpiece-holding spindles to the decoration module;

at least one treatment unit operating along the decoration module to apply a decorative treatment to the articles carried by the workpiece-holding spindles;

a painting module operatively connected with the feeding line for painting the articles carried by the workpiece-holding spindles, wherein the transfer assembly comprises:

a first manipulator configured to simultaneously pick up the plurality of said workpiece-holding spindles from one of said trays;

a continuous conveyor configured to receive the plurality of said workpiece-holding spindles from the first manipulator;

a second manipulator configured to individually transfer the workpiece-holding spindles from the continuous conveyor to the decoration module.

11. The apparatus according to claim 10, wherein the first manipulator comprises a plurality of gripping members mutually interconnected by a pantograph mechanism, geometrically deformable to modify a mutual distance between the gripping members.

12. The apparatus according to claim 10, wherein the continuous conveyor carries a plurality of supports, each configured to engage one of the workpiece-holding spindles, equidistant according to an interaxle spacing greater than an initial interaxle spacing detectable between the workpiece-holding spindles engaged on each of the trays and/or lower than a final interaxle spacing detectable on the handler.

13. The apparatus according to claim 10, wherein the continuous conveyor extends along a closed line having a first section movable at a first cadence and a second section movable at a second cadence different from the first cadence.

14. The apparatus according to claim 13, wherein the continuous conveyor has at least one compensation portion interposed between the first section and the second section and winding around at least one end pulley, movable for varying a length of the at least one compensation portion in response to the movement of the continuous conveyor at at least one chosen from the first section and the second section.

* * * * *